United States Patent [19]

Corey

[11] 4,203,475
[45] May 20, 1980

[54] METHOD FOR LINING A FLANGE FACE FOR LINED PIPE AND PRODUCT OF METHOD

[75] Inventor: Kenneth J. Corey, Fullerton, Calif.
[73] Assignee: Donald J. Lewis, Irvine, Calif.
[21] Appl. No.: 912,043
[22] Filed: Jun. 2, 1978
[51] Int. Cl.² .................... B29C 17/10; B29C 27/02
[52] U.S. Cl. ..................... 138/109; 138/143; 138/DIG. 8; 156/294; 264/138; 264/248; 264/319
[58] Field of Search ............ 264/248, 68, 138; 156/73.1, 73.5, 272, 273, 293, 294, 298, 303.1, 304, 306, 322, 296; 138/109, 143, DIG. 6-8, 140, 177; 228/183, 184; 285/416, 423, 55

[56] References Cited

U.S. PATENT DOCUMENTS

| | | | |
|---|---|---|---|
| 2,440,725 | 5/1948 | Munger | 156/294 |
| 2,608,501 | 8/1952 | Kimble | 156/294 |
| 2,814,835 | 12/1957 | Faulkner | 156/303.1 |
| 2,958,906 | 11/1960 | Youthed | 156/294 |
| 3,192,612 | 7/1965 | Elliott et al. | 285/55 |
| 3,788,928 | 1/1974 | Wise | 156/322 |
| 3,909,049 | 9/1975 | Blatnica | 285/416 |
| 3,968,552 | 7/1976 | Hunter | 285/55 |
| 4,117,201 | 9/1978 | Keifert | 138/DIG. 8 |

FOREIGN PATENT DOCUMENTS

| | | | |
|---|---|---|---|
| 647206 | 8/1962 | Canada | 285/55 |
| 1092488 | 8/1955 | France | 285/255 |
| 322834 | 12/1928 | United Kingdom | 285/55 |
| 1180047 | 2/1970 | United Kingdom | 285/255 |

*Primary Examiner*—W. E. Hoag
*Attorney, Agent, or Firm*—Koda and Androlia

[57] ABSTRACT

A method for providing a flange for an inner lining of a lined pipe including the steps of cutting the lined pipe such that the inner lining projects a predetermined distance out of an outer pipe of the lined pipe, heating the inner lining which projects out of the lined pipe until an outer surface of the inner lining melts and simultaneously heating the inside of a flange ring until it melts and placing the heated flange ring on the heated inner lining whereby a permanent bond is formed between the inner lining and the flange ring.

6 Claims, 8 Drawing Figures

METHOD FOR LINING A FLANGE FACE FOR LINED PIPE AND PRODUCT OF METHOD

BACKGROUND OF THE INVENTION

1. Field of the Invention

This invention relates to lined pipe and more particularly to flanges for the inner lining of a lined pipe.

2. Prior Art

In the prior art there exists several methods for forming a flange for the inner lining of a lined pipe and each of such methods has certain advantages and disadvantages. The earliest method for forming a flange for an inner lining of the lined pipe consisted of forming the flange on the end of the lining when the lining was provided within the outer pipe of the lined pipe. This method is disadvantageous for many reasons. The first reason is that this method requires expensive machinery to form the flange on the end of the inner lining. Another disadvantage is that lined pipe formed with flanges in this manner can not be cut to specific lengths at the place of installation because to do so would cut off the flange.

To overcome the above disadvantages, a method for providing a flange for inner lining has been developed. This method includes the steps of cutting the lined pipe such that a portion of the lining projects out of the lined pipe and the lining itself is flanged back utilizing heat and pressure. Such methods are described in U.S. Pat. Nos. 3,335,484; 3,383,750; 3,390,442 and 3,461,505. This method can be used at the point of installation to provide a flange for the inner lining when the pipe is cut to specific lengths. But again this method has a disadvantage in that the lining in the region of the flange tends to fail with time. To overcome this disadvantage, another method has been developed which simply requires a gasket which forms the flange for mating pipes at the point where the two lined pipes are joined together. This method also allows for changes in the length of the lined pipe at the point of installation but has a particular disadvantage in that the gasket is easily damaged and must be installed with great care to insure that there is no leak.

SUMMARY OF THE INVENTION

Accordingly, it is a general object of the present invention to provide a method for providing a flange for an inner lining of a lined pipe which can be utilized at the place where the lined pipe is installed.

It is yet another object of the present invention to provide a method for providing a flange for an inner lining of a lined pipe which is simple and low in cost.

It is yet another object of the present invention to provide a method for providing a flange for an inner lining of a lined pipe which is reliable.

In keeping with the principles of the present invention, the objects are accomplished by a unique method for providing a flange for an inner lining of a lined pipe. This method includes the steps of cutting the lined pipe such that the inner lining projects a predetermined distance out of an outer pipe of the lined pipe, heating the inner lining which projects out of the lined pipe until the outer surface of the inner lining melts and simultaneously heating the inside of a flange ring until the inside of the flange ring melts and placing the heated flange ring on the heated inner lining whereby a permanent bond is formed between the inner lining and the flange ring.

BRIEF DESCRIPTION OF THE DRAWINGS

The above mentioned features and objects of the present invention will become more apparent from the following description taken in conjunction with the accompanying drawings wherein like reference numerals denote like elements and in which.

DETAILED DESCRIPTION OF THE INVENTION

Figure 1:
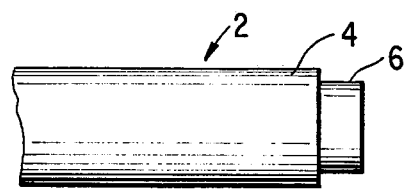
FIG. 1 is a side view of a lined pipe with the lining projecting thereout.

Referring to FIG. 1, shown therein is the first step of the method for providing a flange for an inner lining of a lined pipe 2. In FIG. 1 the outer pipe 4 of the lined pipe 2 is cut such that the lining 6 projects out of the outer pipe 4 a predetermined amount. Preferably, the lining 6 protrudes approximately 7/16 of an inch from the outer pipe 4. The outer pipe 4 is typically made from metal such as a low grade steel and the lining 6 is a plastic such as polyvinyl chloride (PVC) or polypropylene (PPL). It should be apparent, however, that the lining 6 can be made from any material so long as it has the preferred characteristic of melting upon application of heat.

Figure 2:
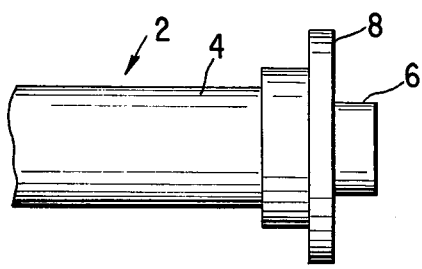
FIG. 2 is a side view of a lined pipe with an outer flange provided on the outer pipe.

As shown in FIG. 2, a flange 8 for the outer pipe 4 is provided on one end of the lined pipe 2. The flange 8 is usually made from the same material as the outer pipe 4 and is coupled to the outer pipe 4 by any of the well known methods such as pressing or by providing threads on the outer pipe 4 and threading the flange 8 thereon.

Figure 3:
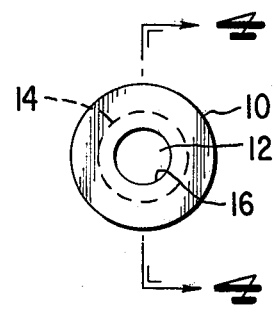
FIG. 3 is a front view of a flange ring in accordance with the teachings of the present invention.
Figure 4:
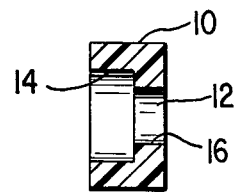
FIG. 4 is a cross sectional view of the flange ring of FIG. 3 taken along the lines 4—4.

Shown in FIGS. 3 and 4 is a flange ring utilized in the method for providing a flange 4 on an inner lining of the lined pipe in accordance with the teachings of the present invention. The flanged ring 10 is substantially circular in shape and is provided with a central bore 12. The central bore 12 is formed in a step like configuration. The larger step portion 14 of the bore 12 has an inside diameter which is substantially the same as the outside diameter of the lining 6. The bore 12 is further provided with a second step portion 16 whose inside diameter is substantially the same as the inside diameter of the inside diameter of the lining 6.

Figure 5:
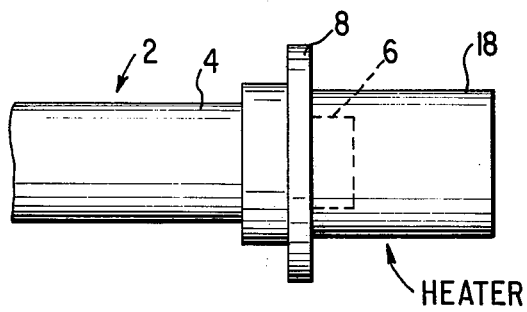
FIGS. 5 and 6 illustrate portions of the method for providing a flange for inner lining in accordance with the teachings of the present invention.
Figure 6:
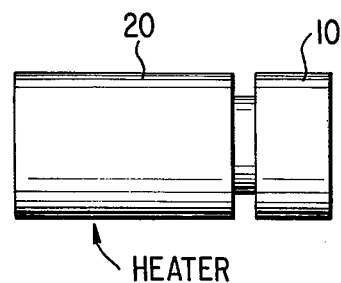
Figure 7:
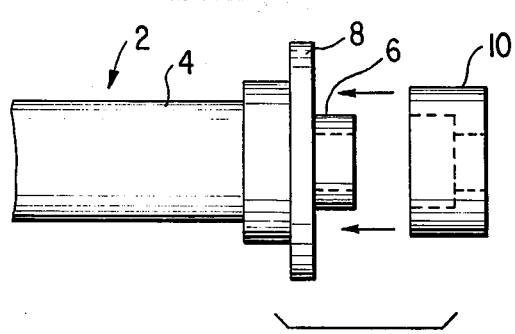
FIG. 7 illustrates a final assembly step for the method for providing a flange for an inner lining of the lined pipe in accordance with the teachings of the present invention.
Figure 8:
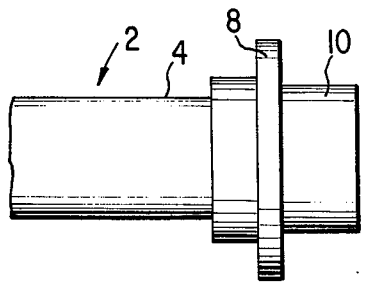
FIG. 8 is a side view illustrating a completed lined pipe in accordance with the teachings of the present invention.

To complete the process the lining 6 is heated with a heater 18 until the outer surface of the inner lining 6 melts, as shown in FIG. 5. As shown in FIG. 6, the step portion 14 of the flange ring 10 is simultaneously heated by a heater 20 until the inner surface of the step portion 14 melts. The flange 10 is then placed onto the lining 6 such that the step portion 14 contacts the outer surface of the lining 6, as shown in FIG. 7. Since the outside surface of the lining 6 is in a molten state and the inside surface of the step portion 14 is in a molten state, the molten material of the inner surface of the step portion 14 flows together with the molten material of the outer surface of the lining 6. When the lining 6 together with the flange ring 10 cools, a permanent bond is formed between the flange ring 10 and the lining 6 to produce a completed lined pipe with a flange for the inner lining thus shown in FIG. 8.

For best results, it is preferable that the flange ring 10 be made from the same material as the lining 6. In other words, it may be a plastic such as polyvinyl chloride or polypropylene or it may be any other material which melts when heated and is compatible with the material of the lining 6.

From the above description, it should be apparent to one skilled in the art that this method can be easily utilized in the field that the point of installation to provide a flange for the inner lining of a lined pipe. It should further be apparent that the flange for the inner lining of the lined pipe can be quickly and easily provided at the point of installation by the present invention. It should further be apparent that in practice the heaters 18 and 20 could be a single heater designed such that it heats the outer surface of the lining 6 and the inner surface of the step portion 14 simultaneously. It will also be possible to make the flange ring 10 such that there is no step portion 16 and with a bore 12 having an inner diameter equal to the outside diameter of the inner lining 6.

It should be apparent to one skilled in the art that the above described embodiment is merely illustrative of but one of the many possible specific embodiments which represents the application of the principles of the present invention. Numerous and varied other various arrangements could be readily devised by those skilled in the art without departing from the spirit and scope of the invention.

I claim:

1. A flanged lined pipe provided with a fusible facing bonded to a fusible inner lining of said lined pipe and adjacent the pipe flange of said lined pipe, said fusible facing for said inner lining being formed by cutting a lined pipe such that the inner lining projects a predetermined distance out of an outer pipe of said lined pipe, said predetermined distance being less than a thickness of a fusible flange ringe, said facing being formed from a flange ring having a stepped bore with a first portion with a first diameter substantially equal to an outer diameter of said inner lining and a second portion having a second diameter equal to an inner diameter of said inner lining, said first portion being of a depth equal to said predetermined distance, heating an outer surface of the inner lining which projects out of the lined pipe and simultaneously heating an inside surface of said first portion of said bore of said flanges ring until the outer surface of the inner lining and the inner surface of said first portion of the flange ring melts and placing the flange ring on the heated inner lining adjacent the pipe flange to form a permanent bond between the inner lining and the first portion of the flange ring.

2. A method of providing a fusible facing for a fusible inner lining of a lined pipe adjacent a pipe flange comprising the steps of:
    cutting the lined pipe such that the inner lining projects a predetermined distance out of an outer pipe of the lined pipe, said predetermined distance being less than a thickness of a fusible flange ring, said flange ring having a stepped bore with a first portion with a first diameter substantially equal to an outer diameter of said inner lining and a second portion having a second diameter equal to an inner diameter of said inner lining, said first portion being of a depth equal to said predetermined distance;
    providing a pipe flange on an end of the outer pipe;
    heating an outer surface of the inner lining which projects out of the lined pipe and
    an inside surface of said first portion of said bore of said flange ring until said outer surface of the inner lining melts and said inside surface of said first portion of the flange ring melts; and
    placing the heated flange ring on the heated inner lining to form a permanent bond between the inner lining and the first portion of the flange ring.

3. A method as in claim 2 further comprising the step of cooling the lining and flange ring after the flange ring has been placed on the inner lining.

4. A method for providing a flange for an inner lining of a lined pipe according to claim 3 wherein said outer pipe is metal and said lining and said flange ring are made from a thermoplastic.

5. A method for providing a flange for an inner lining of a lined pipe according to claim 4 wherein said thermoplastic. is polypropylene.

6. A method for providing a flange for an inner lining of a lined pipe according to claim 5 wherein said inner lining projects 7/16 of an inch out of said outer pipe of said lined pipe.

* * * * *